United States Patent [19]
McLean et al.

[11] Patent Number: 5,282,247
[45] Date of Patent: Jan. 25, 1994

[54] APPARATUS AND METHOD FOR PROVIDING DATA SECURITY IN A COMPUTER SYSTEM HAVING REMOVABLE MEMORY

[75] Inventors: Peter T. McLean; Allen B. J. Cuccio, both of Boulder, Colo.

[73] Assignee: Maxtor Corporation, San Jose, Calif.

[21] Appl. No.: 974,957

[22] Filed: Nov. 12, 1992

[51] Int. Cl.$^5$ .............................................. H04L 9/00
[52] U.S. Cl. .......................................... 380/4; 380/3; 380/23; 380/25
[58] Field of Search ............... 380/3, 4, 23, 26, 25, 380/52; 340/825.34; 364/280.2, 280.8, 969.1, 969.4, 969.3, 975.2

[56] References Cited

U.S. PATENT DOCUMENTS

| | | | |
|---|---|---|---|
| 5,012,514 | 4/1991 | Renton | 380/4 |
| 5,033,084 | 7/1991 | Beecher | 380/4 |
| 5,144,660 | 9/1992 | Rose | 380/4 |

Primary Examiner—David C. Cain
Attorney, Agent, or Firm—Blakely, Sokoloff, Taylor & Zafman

[57] ABSTRACT

A computer system having a memory card for storing data that is capable of being removed and reinserted and also having the capability of safeguarding the data stored thereon. A password is stored on the memory card. The memory card is set in a secure mode to prevent unauthorized access to the data stored on the memory card. Once the memory card is set in secure mode, it remains in secure mode, even when removed from the computer system and subsequently inserted back into that or another computer system. Access to the data is permitted when the memory card is set in secure mode only if a valid password is provided to the memory card.

44 Claims, 4 Drawing Sheets

APPARATUS AND METHOD FOR PROVIDING DATA SECURITY IN A COMPUTER SYSTEM HAVING REMOVABLE MEMORY

FIELD OF THE INVENTION

The present invention pertains to the field of computer systems. More particularly, the present invention relates to an apparatus and method for safeguarding data stored in memory which is removable from the computer system.

BACKGROUND OF THE INVENTION

Today, computer systems come in a host of different forms. They can range from the highly centralized, expensive, and powerful mainframes to versatile mid-range minicomputers and workstations, to the ubiquitous desktop and laptop personal computers. These various, separate computer systems can also be coupled together to form a computer network, thereby allowing end users to share files, application software, and peripheral hardware.

Attendant with most computer systems are data storage devices onto which digital data from the computer system is stored. In this manner, computer programs, textual information, graphics, and numerical data can be stored on a permanent basis for subsequent retrieval. There exists many different options for storing digital data. Some popular methods include optical and magneto-optical disk drives, tape drivers, and magnetic storage systems such as floppy disk drives.

Typically, these storage systems are fixedly attached within the computer system. This means that the computer system would have to be disassembled before the storage system could be physically removed. Hence, the data stored on these storage systems are physically tied to the host computer system and/or computer network. Hence, a person could not simply pick up and walk away with the storage unit containing the data. In many instances, the owner of the stored information is not only concerned about physically losing the data but is also concerned with keeping the stored information confidential. For example, the stored information might contain sensitive sales reports, marketing strategies, blueprints, manufacturing processes, customer lists, trade secrets, etc.

In order to safeguard the stored information, various schemes have been implemented to prevent unauthorized reading, copying, and erasing of the data by others. For example, one such security measure might require the input of a user identification number before that person is allowed to log onto the computer system. In addition, the user might be required to supply a secret password. Other security measures include encrypting the data, wherein the encrypted data is meaningless to unauthorized users. Only authorized users are provided with a means for deciphering the encrypted data. In short, when the storage mechanism containing valuable data is structurally integrated as part of the computer system, the computer's security protection prevents unauthorized access and tampering of the data.

Rapid advances in optical and magnetic recording technology have lead to smaller disk drives while storage capacity has increased. Furthermore, progress in the semiconductor field has led to the development of "flash" electrically erasable programmable read-only memory (flash EEPROM). The flash EEPROM is a non-volatile semiconductor memory in which digital data can readily be stored.

In order to take advantage of recent advances made in the storage technology, a group of computer and electronics manufacturers have formed the Personal Computer Memory Card International Association (PCMCIA) to define a set of standards for promoting interchangeability of data storage (i.e., memory cards) and peripheral expansion (i.e., I/O cards) among a variety of computer and other electronic products. The PCMCIA standard achieves interchangeability by defining a common set of physical dimensions, electrical interface, and data formats for the memory and I/O cards. The physical dimensions specify outer boundaries, mechanical tolerances, and connectors for the cards. The electrical interface section provides detailed pinout and signal definitions. The data format specifies the organization of the data on a card. The PCMCIA standard facilitates the introduction of small, portable, and lightweight memory cards based on either hard disk drive or flash EEPROM technology. These memory cards can readily be removed from its host computer system and later inserted back into the host system or some other PCMCIA compatible computer system.

This feature grants a user great flexibility and freedom in transporting the stored data. For example, a user can be writing a program, generating a report, updating a database, or otherwise working on a computer network at the workplace. The user can store the computer programs, database, etc. on the memory card. The memory card can be easily removed from the host computer system and placed in a shirt pocket, briefcase, or purse. This memory card can then subsequently be inserted into a laptop or notebook computer, thereby allowing the user to continue working on his other project. Later, the memory card can be removed and inserted in yet another PCMCIA compatible computer system (perhaps at home). Thus, users are free to travel and to take along their data with them in the form of memory cards so that the stored data can be accessed, updated, or edited on mobile computer systems or on computer systems other than their own.

However, along with the convenience associated with memory cards comes a problem in that memory cards can be misplaced, lost, or stolen. Whoever acquired the memory card could easily plug the memory card into a computer system and would have complete access and control over the data stored thereon. With a small, removable data storage mechanism, the user's host computer system can no longer safeguard the stored data.

Thus, what is needed is an apparatus and method for safeguarding data stored on a memory card from unauthorized access. It would be preferable for the safeguarding mechanism to impose a minimal burden on the user.

SUMMARY AND OBJECTS OF THE INVENTION

In view of the problems associated with removable memory cards, one object of the present invention is to provide an apparatus and method for safeguarding data stored on a removable data storage device against unauthorized users.

Another object of the present invention is to provide security for data access on memory cards which is comparable to that provided by a host computer system for data access on a non-removable data storage device.

Another object of the present invention is to minimize the burdens imposed on a user associated with safeguarding data stored on a memory card.

These and other objects of the present invention are implemented in a computer system that has a memory card for storing data. The memory card can be a hard disk drive, flash electrically erasable read-only memory, or some other similar memory. The memory card is designed so that it can readily be removed from and inserted back into that or a different computer system, thereby rendering it possible for a user to conveniently carry the memory card and the stored data. The memory card has the capability of safeguarding the data stored thereon from unauthorized access.

The safeguarding measure is implemented by selecting a unique password and storing it on the memory card. An authorized user can set the memory card in a secure mode. Once the memory card is set in secure mode, access to the data stored on the memory card is denied unless the valid password is provided. In other words, data cannot be read from, written to, nor erased from the memory card if it is in the secure mode, unless it is first unlocked by supplying it with a valid password. The memory card remains in secure mode, even when removed from the computer system and subsequently inserted back into the same or a different computer system. Once the memory card is set in a secure mode, it can be set back in a non-secure mode only if a valid password is provided.

The password can be specified by the user, or it can be a machine readable code such as the serial number of a computer system. In one embodiment of the present invention, multiple passwords are stored on the memory card, and a pre-determined number of passwords are required in order to unlock it. The passwords can be encoded to provide another level of security. Furthermore, the memory card can be designed to shut off if it is in secure mode and the password is not provided.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

An apparatus and method for safeguarding data stored on a removable memory card is described. In the following description, for purposes of explanation, numerous specific details are set forth, such as commands, passwords, information signals, etc. It will be apparent, however, to one skilled in the art that the present invention may be practiced without these specific details. In other instances, well-known structures and devices are shown in block diagram form in order to avoid unnecessarily obscuring the present invention. Although the following description is directed towards a hard disk memory card, the present invention can likewise be applied to flash EEPROM memory cards as well as other kinds of memory cards.

Figure 1:
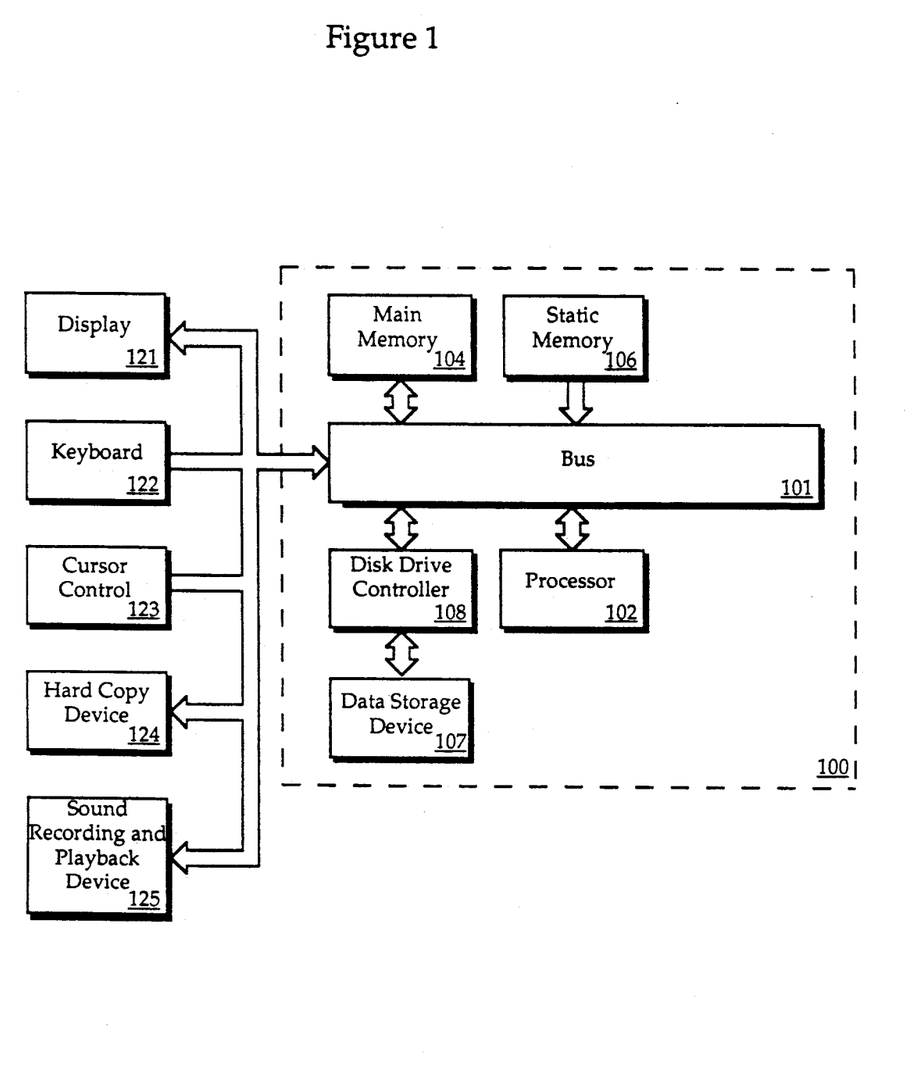
FIG. 1 illustrates a computer system upon which the preferred embodiment of the present invention can be implemented.

Referring to FIG. 1, the computer system upon which the preferred embodiment of the present invention can be implemented is shown as 100. Computer system 100 comprises a bus or other communication means 101 for communicating information, and a processing means 102 coupled with bus 101 for processing information. System 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. A data storage device 107 such as a physically removable memory card is coupled to bus 101 for storing information and instructions through the disk drive controller 108 which provides an interface between processor 102 and data storage device 107.

Computer system 100 may further be coupled to a display device 121, such as a cathode ray tube (CRT) coupled to bus 101 for displaying information to a computer user. An alphanumeric input device 122, including alphanumeric and other keys, may also be coupled to bus 101 for communicating information and command elections to processor 102, and for controlling cursor direction keys, coupled to bus 101 for communicating direction information and command selections to processor 102, and for controlling cursor movement on display 121. This input device typically has two degrees of freedom in two axes, a first axis (e.g., x) and a second axis (e.g., y) which allows the device to specify any position in a plane. Another device which may be coupled to bus 101 is hard copy device 124 which may be used for printing instructions, data, or other information on a medium such as paper, film, or similar types of media. Lastly, computer system 100 may be coupled to a device for sound recording and/or playback 125 such as an audio digitizer means coupled to a microphone for recording information. Further, the device may include a speaker which is coupled to a digital to analog (D/A) converter for playing back the digitized sounds.

Figure 2:
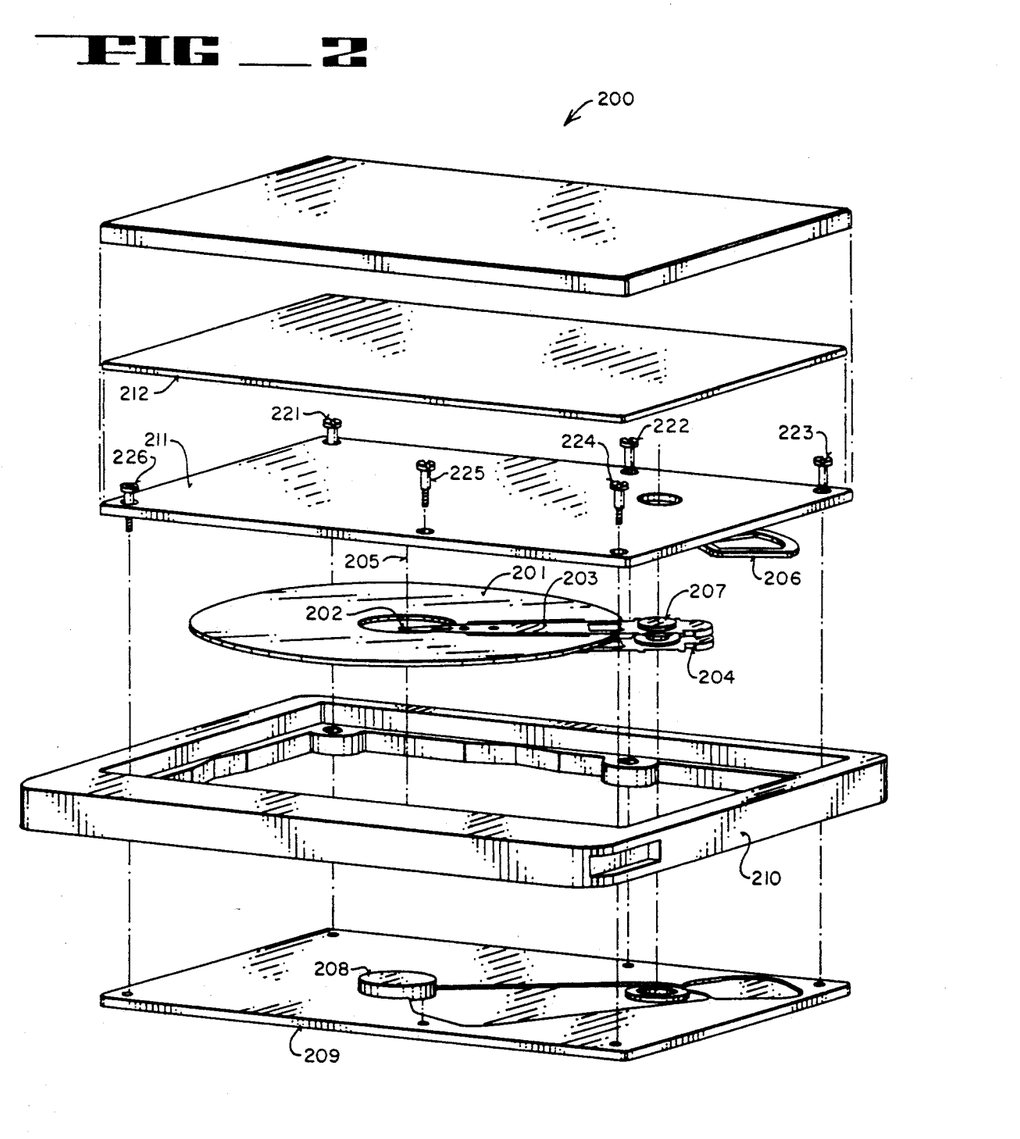
FIG. 2 illustrates an exploded view of a hard disk memory card upon which the present invention may be implemented.

FIG. 2 illustrates an exploded view of a hard disk memory card 200, upon which the present invention may be implemented. Digital data is stored onto a magnetic disk 201. A transducer 202, also commonly known as a "head", resides at the tip of arm 203 of actuator assembly 204. Transducer 202 is used to write digital data onto and read digital data form disk 201. A spindle motor 208 causes disk 201 to rotate about axis 205. A voice coil 206 is attached to actuator assembly 204, opposite from arm 203. Voice coil 206 resides within a magnetic field. When an electrical current is sent through voice coil 206, a torque is produced, which causes actuator assembly 204 to pivot about axis 207. In turn, transducer 202 is swept radially across the surface of rotating disk 201. Thereby, data is stored onto disk 201 as a series of concentric circles, known as "tracks". The combination of disk 201, actuator assembly 204, and spindle motor 208 is known as a head Disk Assembly (HDA). The HDA is enclosed within base plate 209, frame 210 and HDA cover 211.

A printed circuit board 212 resides above HDA cover 211. Printed circuit board 212 includes electronics such as a servomechanism for controlling the movement of the transducer, amplifiers for amplifying read/write signals, filters for minimizing error due to noise and media defects, detection and decode circuits. A top cover 213 is placed over printed circuit board 212. Six screws 221-226 are used to seal memory card 200.

Figure 3:
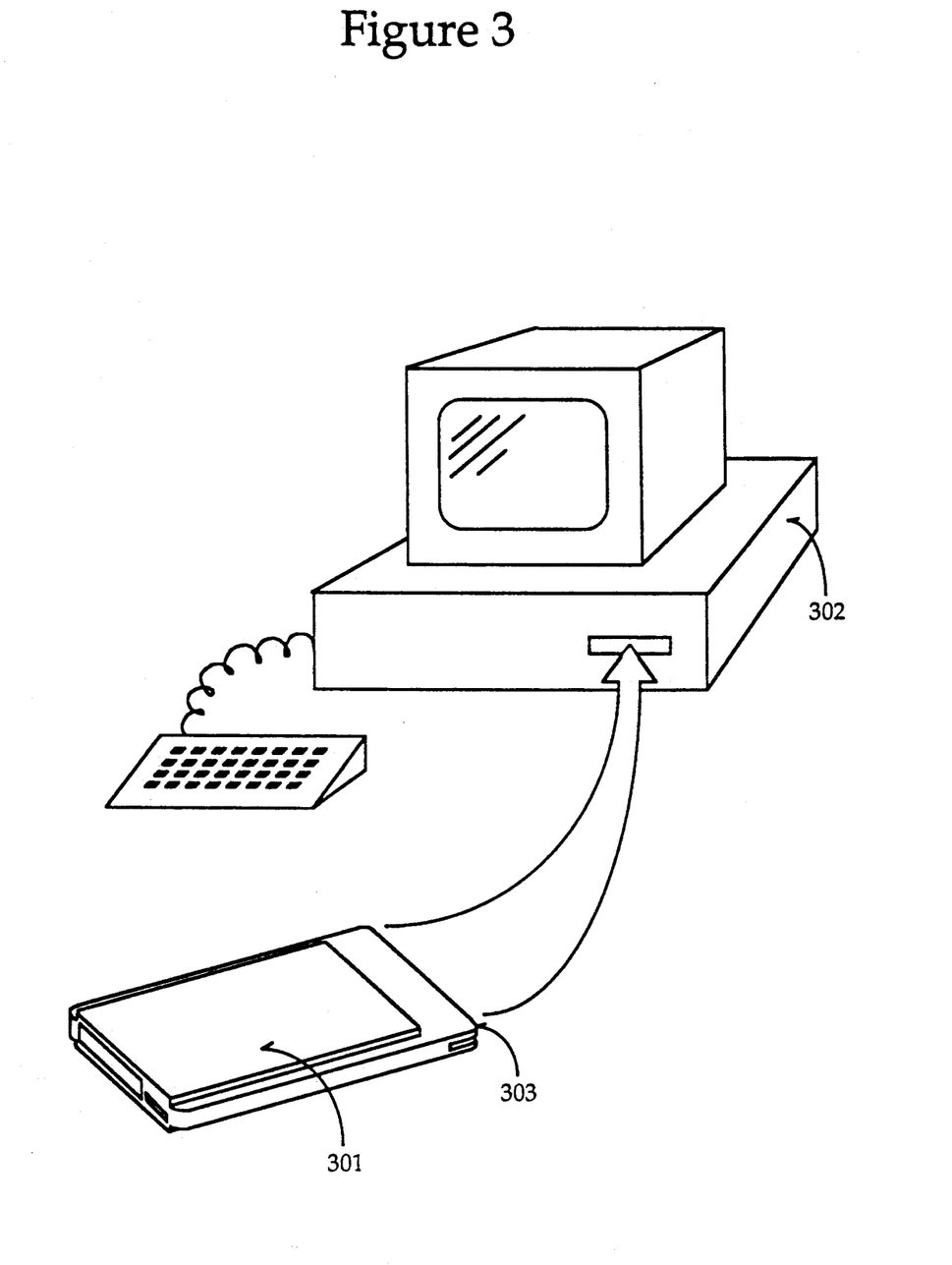
FIG. 3 illustrates a memory card and a host computer system.

FIG. 3 illustrates a memory card 301 and a host computer system 302. Computer system 102 can be a notebook or laptop computer, a personal computer, a minicomputer or a workstation. Memory card 301 can be physically inserted and removed from computer system 302. A 68 pin socket 303 is implemented at one end of memory card 301 so that it can mate with a 68 pin connector within computer system 302. The PCMCIA specification defines three outer dimensions for memory card 301.

In order to protect data stored on memory card 301, an authorized user can command the host computer system 302 to set memory card 301 in "secure" mode. Once memory card 301 is set in secure mode, it retains its secure mode, even when powered down. In other words, when memory card 301 is powered down and/or removed from computer system 302, it comes up in secure mode when it is subsequently reinserted and powered up. The user also specifies one or more unique "passwords" which are stored on memory card 301 is a designated location which is not accessible by normal user commands.

When in secure mode, memory card 301 can communicate with computer system 302. Memory card 301 will not execute any data transfer commands such as read, write, or erase data, from computer system 302, unless a correct password is supplied to "unlock" it. Consequently, upon power up of a computer system 302 having an inserted memory card 301 or upon insertion of memory card 301 to a running computer system 302, a determination is made as to whether the memory card 301 is already in secure mode.

If memory card 301 has been set in secure mode, it must be "unlocked" before it will execute any data transfer commands. Unlocking is accomplished by providing the memory card with a valid "password". Subsequently, a user can elect to "lock" the memory card. Hence, the present invention involves a cooperative scheme between memory card 301 and the computer system 302. In the currently preferred embodiment of the present invention, the user prompts the computer system to issue the following commands to the memory card: SET_SECURE which gives an authorized user the ability to set the memory card in secure mode; DISABLE_SECURE which gives an authorized user the ability to disable secure mode; LOCK which prohibits unauthorized access to the stored data; and UNLOCK which allows an authorized user the capability to gain access to the stored data. The user also provides the memory card with one or more passwords via the computer system. The memory card notifies the computer system and user of its current state and status by sending an IDENTIFY_DRIVE command response. The functions and interactions of these commands and passwords are described in detail below.

Three vendor unique bits in the IDENTIFY_DRIVE command response are used to notify the user of secure mode states: Unlckd, Secure Set and Secure Implmtd. The Unlckd bit indicates whether the memory card has been unlocked so that data transfer commands are executable. The Secure Set bit indicates whether the memory card is currently in secure mode. The Secure Implmtd bit indicates whether the memory card is capable of secure mode operation. Table 1 below illustrates the functions of these bits, wherein bit 0=Secure Implmtd, bit 1=Secure Set, and bit 2=Unlckd.

TABLE 1

| Bits 2,1,0 | Function |
| --- | --- |
| 001 | Indicates the drive implements Secure mode but has not been set into secure mode. Data transfer commands will execute. |
| 011 | Indicates the drive implements Secure Mode and is set into Secure mode but is locked. Data transfer commands will be rejected. |
| 111 | Indicates the drive implements Secure Mode, is set into Secure Mode, and is unlocked. Data transfer commands will execute. |

The memory card is set into secure mode by the SET_SECURE command. The user may specify one or more passwords. Each password can be up to 512 bytes in length. The user may also specify that more than one of the passwords must be matched to unlock the memory card. The number of required matches is placed in a features register before the SET_SECURE command is issued. The value set a Sector Count register indicates the number of 512 byte passwords which will be passed with this command. The SET_SECURE command resembles a write command in that the sector count is valid and the command is followed by the transfer of n sectors of data to the memory card. Each of the n sectors represents a unique password. These passwords may be a short password with zero fill. They may be a short password replicated many times. Perhaps these passwords can be inverted according to a pre-determined pattern. Alternatively, they may be a very long password. In reference to the memory card, the passwords comprise 512 byte values. Once the memory card receives the passwords it does an n+1 sector write into an area inaccessible by normal transfer commands The first sector contains the number of passwords (i.e., the number of sectors in the user's SET_SECURE command) and the number of sector matches required (i.e., the content of the features register). This is followed by the n sectors of passwords. The IDENTIFY_DRIVE response is then updated to reflect that "secure mode" is set.

If a memory card is in secure mode and has been unlocked, it will accept the SET_SECURE command and add the password written to the list of valid passwords. If the memory card is in secure mode and has not been "unlocked," it will reject the SET_SECURE command with errors set. In other words, the SET_SECURE command is accepted and executed only by a memory card implementing secure mode which is either not currently in secure mode or is in secure mode and unlocked (i.e., IDENTIFY_DRIVE bits 2:0 are 001 or 111).

If the memory card were already in secure mode when the SET_SECURE command is issued, the number of matches required reflects the value set by the new command and the passwords passed are added to the already existing set of passwords. Upon completion of this command, the IDENTIFY_DRIVE information, bits 2:0 reflects that secure mode is set and unlocked (i.e., bits 2:0=111).

When in secure mode, the memory card will come up in the locked state any time it is inserted/powered-up.

In a locked state, it responds to all non-data transfer commands, but rejects all data transfer commands with an Abort error set until unlocked. If the SET_SECURE command is used while the memory card is in Secure Mode but locked, it will be rejected and the Abort error response will be returned.

Another vendor unique command, DISABLE_SECURE, allows the memory card to be taken out of secure mode. This command is accepted and executed only if a memory card is in secure mode and is unlocked. If the memory card is in secure mode and has not been unlocked, the memory card rejects the DISABLE_SECURE command and generates an Abort error response.

Upon successful completion of this command, the memory card will no longer be in secure mode, and the memory card will zero fill the number of passwords sector and negate the secure mode identifier in the IDENTIFY_DRIVE response. Furthermore, the memory card does not require subsequent unlocking to execute data transfer commands.

When inserted/powered up, the memory card goes through the standard startup routine, and the state of secure mode is noted. If in secure mode, the memory card rejects transfer commands until an UNLOCK command is received.

The UNLOCK command is another vendor unique command. It resembles a write command. The sector count is set at the number of sector matches required to unlock the memory card. The sector count includes the transfer of one sector of data to the memory card for each required match. When data is received, it is not written. Instead, the input data is compared to the valid stored passwords. The UNLOCK command is accepted and executed if the memory card is in secure mode and is locked (i.e., IDENTIFY_DRIVE drive bits 0:2 are 011. If the required number of matches are found, the memory card unlocks and function normally (i.e., data transfers are allowed). If no match is found an Abort error message generated in response to the UNLOCK command, and the memory card remains locked. When removed/powered down, the memory card again assumes the locked state.

In an alternative embodiment of the present invention, to prevent automated generation of "passwords" in an attempt to defeat the "lock", the memory card waits a second before accepting another UNLOCK command. After ten such failed attempts, the memory card disables itself.

The sector count register contains the number of 512 byte passwords to be passed to the memory card and to be matched. If this number is not equal to the number of matches specified when the memory card was placed in secure mode, the UNLOCK command is rejected and an Abort error is returned. The memory card matches the password(s) passed with this command with the set of passwords established when the memory card was set into secure mode. If each unlock password matches with a different password in the established set of passwords, the memory card unlocks. Upon such successful completion, the IDENTIFY DRIVE bits 2:0 are set to 111 (i.e., secure mode set and unlocked). Once the memory card is unlocked, it will accept and execute data transfer commands. If the required password matches are not found, the UNLOCK command is rejected with an Abort error.

The LOCK command sets an unlocked memory card into a locked state. When the memory card is in a locked state, access to the stored data is denied. The memory card accomplishes this by not executing any received data transfer commands. By utilizing the LOCK and UNLOCK commands, a user has the option of securing the stored data at his or her discretion. For example, a user can safeguard the stored data by locking the memory disk before departing for lunch. When the user returns from lunch, the user can supply a password to unlock the memory card to gain access to the stored data.

The following discussion describes the functions of the computer system in detail. If a memory card of the present invention were inserted into a compatible computer system which does not have the capability of implementing secure mode operations, one of two results would occur. If the inserted memory card is not in secure mode, data could be accessed in a normal manner. If, however, the memory card happens to be in secure mode, the memory card prevents access to the stored data. The first ten attempts at data transfers by the computer system would fail. Soon thereafter, the memory card shuts itself off.

If the memory card is inserted into a computer system which has been designed to recognize secure mode operations, the computer system checks to determine whether the memory card is in secure mode. This is accomplished by reading the IDENTIFY_DRIVE response from the memory card. If the memory card is not in secure mode, access to the stored data is granted and data transfers are handled in a conventional manner. If, however, the memory card is locked, it needs to be unlocked before data transfers are allowed.

A variety of passwords can be implemented. Passwords can be supplied by the host computer system upon request of the user. Alternatively, a user could choose the password(s). For example, when requested to set a memory card to secure mode, the host computer system could provide its machine readable serial number as a password. In such a case, the memory card could be unlocked only when inserted in that particular host computer system. It could subsequently be unlocked automatically without user intervention. The host computer system might also request the user to supply the machine readable serial numbers of other computer systems on which the user desires to use the memory card. This would allow any one of a set of computer systems to automatically unlock the memory card.

In another embodiment, the host supplies its unique Ethernet address along with the unique Ethernet addresses of the computer systems on its local area network (LAN) as passwords. Consequently, the memory card can be inserted into any computer system on this LAN and be unlocked automatically.

The present invention can be applied to computer systems running on a time share account and for accessing a computer system via a dial-in modem, by requiring the user to supply a personal password. Thereby, when the memory card is inserted, the computer system queries the user for the password. The password input by the user is compared against the genuine password(s) stored on the memory card for verification. Access to the data stored on the memory card can be expanded to include a group of users by writing the passwords of each authorized user onto the memory card before it is placed in secure mode. Security can further be enhanced by requiring the use of multiple passwords to unlock a memory card. For example, a computer readable password plus a user's personal password must both be supplied before access to the stored data is granted. In an alternative embodiment, the memory card could require that multiple passwords be required in order to unlock the memory card. In yet another embodiment, passwords are encoded to provide another level of security. In such a system, an unauthorized user must not only have physical control over the memory card and have knowledge of the passwords, but must also know the encoding scheme before gaining access to the stored data. However, as the level of security increases, the burden imposed on a user similarly increases.

Furthermore, an "emergency" password can be implemented in case of failures or if a user forgets the passwords. An emergency password might include an arbitrary set of information such as the user's full name, home address, phone number, social security number, place of birth, etc. This results in a large password that is difficult to duplicate by anyone other than the authorized user.

The host computer functions described above are performed by a piece of software code residing in the computer system. This software code is triggered every time a memory card is inserted into the computer system. The software code determines whether the memory card is in a secure mode. If the memory card is in secure mode, the software either unlocks it automatically by supplying its serial number and/or requests one or more passwords from the user in order to unlock the memory card. This same software code also allows the user to set secure mode either "on" or "off". In addition, it also facilitates the establishment of passwords.

Figure 4:
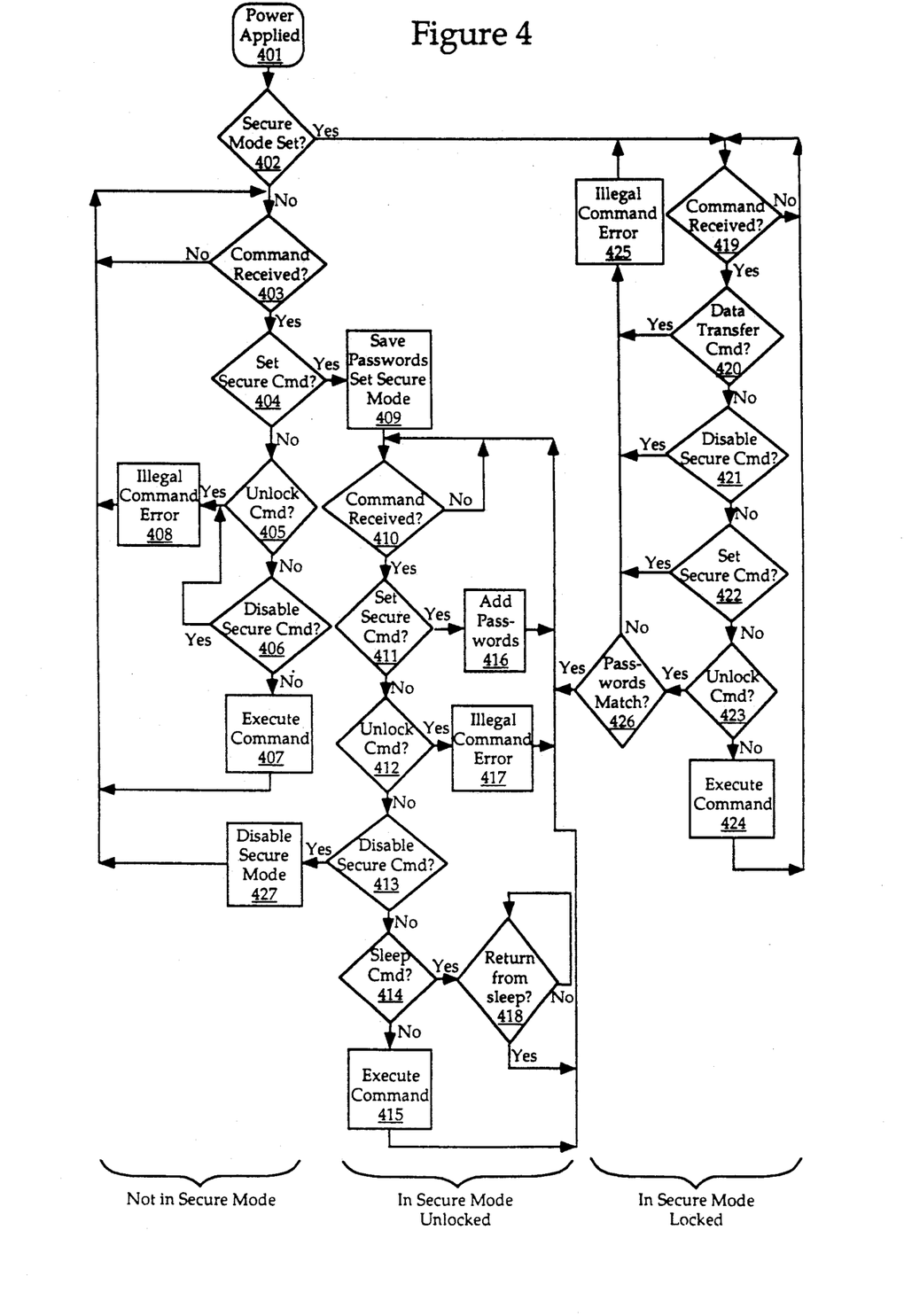
FIG. 4 is a flowchart illustrating the steps of the present invention which is performed when a memory card is inserted into a computer system.

FIG. 4 is a flowchart illustrating the steps performed when a memory card is inserted into a computer system. First, a computer system having an inserted memory card is powered up, or a memory card is inserted into a computer system which is already powered up, step 401. Next, the computer system determines whether the memory card is set in secure mode, step 402. If the memory card is not set in secure mode, the computer system waits for a command, step 403. Once a command is received, a determination is made as to whether it is a set secure mode command, step 404. If a set secure command was not received, another determination is made as to whether an unlock command was received, step 405. If the command was not an unlock command, a determination is made to whether the received command is a disable secure mode command, step 406. If the received command was not a disabled secure mode command, then the received command is executed (i.e., data transfer commands are enabled), step 407. Given an unlock command or a disable secure mode command in steps 405 and 406, an illegal command error is generated, step 408, and step 403 is repeated.

However, if a set secure command was received and determined in step 404, any inputted passwords are saved onto the memory card, and the memory card is set in secure mode, step 409. The memory card waits for a command, step 410. Once a command has been received, a determination is made as to whether the command is a set secure mode command, step 411. If the received command was not a set secure mode command, a determination is made as to whether the command is an unlock command, step 412. If the receive command is not an unlock command, a determination is made as to whether the received command is a disable secure mode command, step 413. If the received command is not a disable secure mode command, a determination is made as to whether it is a sleep mode command, step 414. Given that the decisions of steps 410-414 are all negative, the memory card executes the received command (i.e., data transfers are allowed), step 415. If a set secure mode command was received in step 411, additional passwords can be added to the memory card, step 416. Step 410 is repeated. If an unlock command was received in step 412, an illegal command error is generated, step 417. Step 410 is repeated. If a disable secure mode command was received in step 413, the secure mode is disabled, step 427. Step 403 is repeated. If a sleep command was received in step 414, the memory card remains in sleep mode until a return from sleep command is received in step 418. Sleep mode is commonly used in laptop, notebook, and portable computer systems which are battery operated. Sleep is implemented to minimize power consumption in order to extend battery life. Note that when the memory card returns from sleep mode, it does not need to be unlocked. Thereupon, step 410 is repeated. After execution of the received command in step 415, step 410 is repeated.

If secure mode was set as determined in step 402, the memory card waits to receive a command, step 419. Once a command is received, the memory card determines whether it is a data transfer command, step 420. If the receivd command is a data transfer command as determined in step 420, an illegal command error is generated, step 425. Otherwise, the memory card determines whether the received command is a disable secure mode or a set secure mode command, steps 421 and 422. If the received command is not a disable secure mode nor a set secure mode command, the memory card determines whether it is an unlock command, step 423. If the received command is not an unlock command, the memory card executes the received command (i.e., data transfers are allowed), step 424. If it is transfer, disable secure mode, or set secure mode command, an illegal command error is generated, step 425. In step 423, if it is determined that the received command is an unlock command, the memory card compares the supplied password against the genuine password stored on the memory card, step 426. If the passwords match, step 410 is performed. Otherwise, step 425 is performed.

Steps 403-408 and 427 correspond to the memory card not being in secure mode. Steps 409-418 correspond to the memory card being in secure mode and unlocked. Steps 419-425 correspond to the memory card being in secure mode and locked.

Thus, an apparatus and method for providing data security in a computer system having a removable memory is disclosed.

What is claimed is:

1. A computer system comprising an input means for inputting data, a processing means for processing data, a data storage means for storing data, and an output means for outputting processed data, said data storage means including a means for removing said data storage means from said computer system, a means for inserting said data storage means into said computer system, and a means for safeguarding data stored on said data storage means, said safeguarding means comprising:
   a means for writing at least one password to said data storage means;
   a means for setting said data storage means to a secure mode, wherein data transfer commands are not executed unless said data storage means receives said password;

a means for said data storage means to remain set in said secure mode if said data storage means is removed from said computer system.

2. The computer system of claim 1, wherein said safeguarding means further comprises a means for setting said data storage means in a non-secure mode only after said data storage means has received said password, wherein data commands are executed by said data storage means when set in said non-secure mode.

3. The computer system of claim 2, wherein said safeguarding means further comprises a means for generating a notification signal in response to data commands if said data storage means is set in said secure mode and said data storage means has not received said password.

4. The computer system of claim 3, wherein said safeguarding means further comprises a means for generating a signal indicating whether said data storage means is set in said secure mode.

5. The computer system of claim 4, wherein said data storage means comprises a hard disk memory card.

6. The computer system of claim 4, wherein said data storage means comprises a flash electrically erasable read-only memory card.

7. The computer system of claim 4, wherein said password is specified by a user.

8. The computer system of claim 4, wherein said password comprises a machine readable serial number.

9. The computer system of claim 4, wherein said password is encoded.

10. The computer system of claim 4, wherein a plurality of passwords are stored on said data storage means and more than one of said plurality of passwords must be received by said data storage means before data commands are executed if set in said secure mode.

11. The computer system of claim 4, wherein an emergency password is stored on said data storage means, wherein said data storage means executes any commands when said emergency password is received.

12. The computer system of claim 11, wherein said emergency password comprises personal information of a user.

13. The computer system of claim 4, wherein said safeguarding means further comprises a means for disabling said memory storage means whenever a predetermined number of data commands is received by said memory storage means while in secure mode and without receiving said password.

14. In a computer system having a data storage system for storing data, wherein said data storage system is removable from said computer system, a method of preventing unauthorized access to data stored on said data storage system, comprising the steps of:

storing a password on said data storage system;

setting said data storage system in a secure mode, wherein data commands from said computer system are not executed unless said password is provided to said data storage system;

retaining said secure mode by said data storage system if said data storage system is subsequently removed from said computer system.

15. The method of claim 14 further comprising the step of setting said data storage system in a non secure mode, wherein data commands from said computer system are executed and wherein said data storage system can only be set in said non secure mode when said password has been provided.

16. The method of claim 15 further comprising the step of generating a notification signal in response to data commands from said computer system if said data storage system is set in said secure mode and said password has not been provided.

17. The method of claim 16, wherein said data storage device comprises a hard disk memory card.

18. The method of claim 16, wherein said data storage system comprises a flash electrically erasable read-only memory.

19. The method of claim 16, wherein said password is specified by a user.

20. The method of claim 16 further comprising the step of transmitting a signal from said data storage system to said computer system indicating whether said data storage system is capable of being set in secure mode.

21. The method of claim 20, wherein said signal further indicates whether said data storage system is currently set in said secure mode.

22. The method of claim 21, wherein said signal further indicates whether said data storage system will execute received data commands.

23. The method of claim 16 further comprising the step of storing a second password onto said data storage system, wherein said data storage system does not execute data commands from said computer system if said data storage system is set in secure mode, unless both of said passwords are provided to said data storage system.

24. The method of claim 16 further comprising the step of encoding said password.

25. The method of claim 24, wherein said encoding step includes inverting a pre-determined portion of said password.

26. The method of claim 16, wherein said password is a machine readable serial number of said computer system and said computer system provides said machine readable serial number when said data storage system is inserted into said computer system so that said data storage system executes data commands.

27. The method of claim 26 further comprising the step of storing a second machine readable serial number of a second computer system as a second password onto said data storage system, wherein said data storage system executes data commands whenever inserted into either of said computer systems.

28. The method of claim 27, wherein said computer systems comprise a computer network.

29. The method of claim 16 further comprising the step of storing an emergency password on said data storage system, wherein said data storage system performs any commands from said computer system upon receipt of said emergency password from said computer system.

30. The method of claim 29, wherein said emergency password comprises personal information of a user.

31. The method of claim 16 further comprising the step of shutting off said memory storage system if more than a predetermined number of data commands are received by said memory storage system when in secure mode and no password has been provided.

32. A hard disk memory card having a security means for granting access to data stored on said memory card only to authorized users, comprising:

a means for storing at least one password on said memory card;

a means for setting said memory card in a secure mode, wherein data transfer commands are not executed while said memory card is set in said secure mode unless said memory card has been unlocked;

a means for unlocking said memory card by comparing a received password with said password stored on said memory card, wherein said memory card is unlocked if said received password matches said stored password;

a means for setting said memory card in a non-secure mode only when said memory card has been unlocked;

a means for said memory card to remain set in said secure mode even if power is not supplied to said memory card.

33. The memory card of claim 32 further comprising a means for generating a signal indicating whether said memory card is set in said secure mode.

34. The memory card of claim 33 further comprising a means for generating a notification signal in response to said data transfer commands if said memory card is set in secure mode and is locked.

35. The memory card of claim 34, wherein said data transfer commands include read, write, and erase commands.

36. The memory card of claim 35, wherein said password comprises 512 bytes of data.

37. The memory card of claim 35 further comprising a means for disabling said memory card whenever a predetermined number of data transfer commands are received while said memory card is set in secure mode and is locked.

38. The memory card of claim 35, wherein said password is encoded.

39. The memory card of claim 35, wherein said password is specified by a user.

40. The memory card of claim 35, wherein said password comprises a machine readable serial number of a computer system.

41. The memory card of claim 35, wherein a plurality of passwords are stored on said memory card and a pre-determined number of passwords must be received before said memory card is unlocked.

42. The memory card of claim 35, wherein an emergency password is stored on said memory card.

43. The memory card of claim 35 further comprising a means for disabling said memory card if a pre-determined number of data transfer commands are received by said memory card while said memory card is set in said secure mode and is locked.

44. The memory card of claim 35 further comprising a means for locking said memory card, wherein said data transfer commands are not executed.

* * * * *